2 Sheets--Sheet 1.

L. J. DAVIS.
Cultivators.

No. 152,343. Patented June 23, 1874.

Witnesses:
N. K. Du Hamel
Thomas Byrne

Inventor:
Levi J. Davis
Per H. J. Abbot
Attorney.

2 Sheets--Sheet 2.
L. J. DAVIS.
Cultivators.
No. 152,343. Patented June 23, 1874.
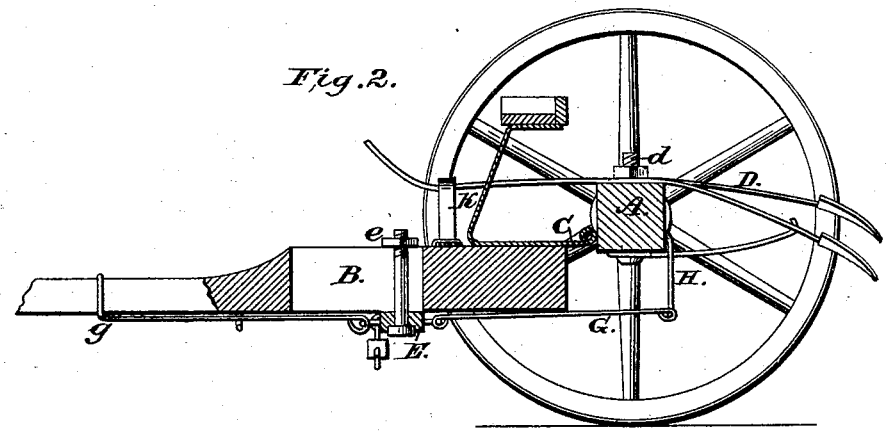
Witnesses:
W. H. Du Hamel
Thomas Byrne
Inventor.
Levi J. Davis
Per H. S. Abbot.
Attorney.

UNITED STATES PATENT OFFICE.

LEVI JUDSON DAVIS, OF ELLSWORTH, OHIO.

IMPROVEMENT IN CULTIVATORS.

Specification forming part of Letters Patent No. 152,343, dated June 23, 1874; application filed December 3, 1873.

*To all whom it may concern:*

Be it known that I, LEVI J. DAVIS, of Ellsworth, county of Mahoning and State of Ohio, have invented certain new and useful Improvements in Cultivators, of which the following is a specification:

My invention relates to certain improvements in cultivators, whereby the bars which carry the teeth or shovels may be readily raised from contact with the ground when the machine is to be moved from place to place; and it consists in attaching said bars to the axle of the machine, to which the tongue is connected by hinges, and in connecting the whiffletree to the axle by means of a rod or bar.

Figure 1:
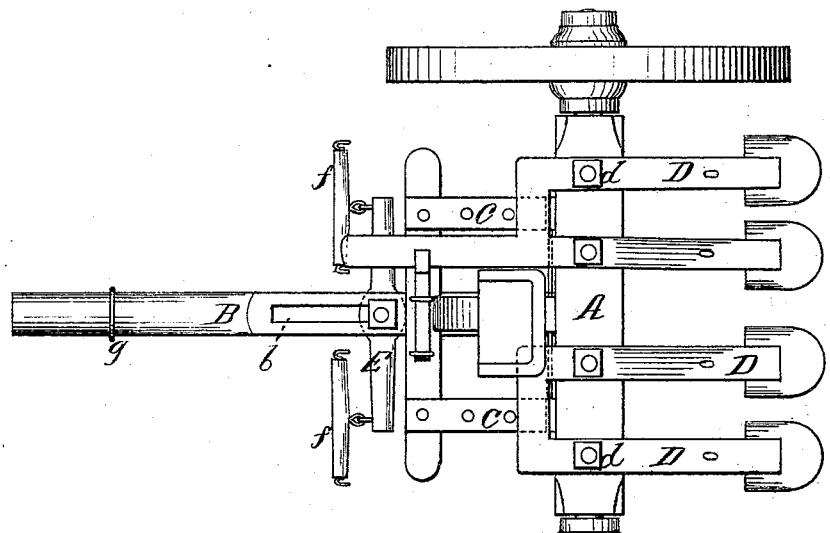
Figure 3:
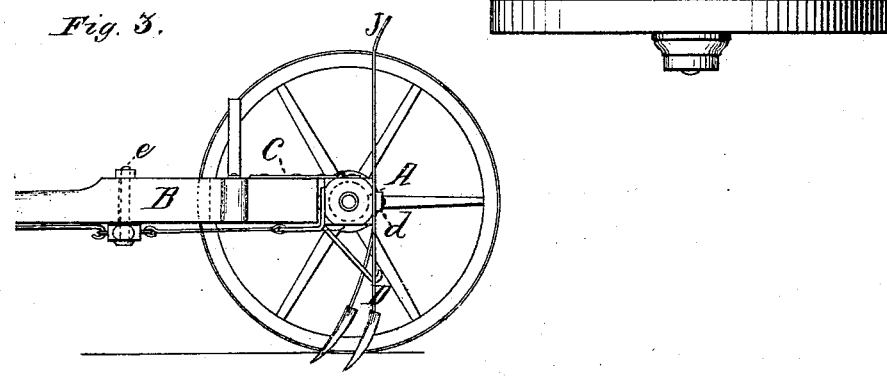

In the accompanying drawing, Figure 1 represents a plan or top view of my improved cultivator. Fig. 2 is a transverse section, showing the shovel-bars in a raised position. Fig. 3 is a similar view, showing the shovel-bars in contact with the ground.

A represents the axle of the machine, which is connected to the tongue B by means of hinges C. The shovel-bars D are rigidly attached to the axle A by bolts $d$. The whiffletree, or a bar, E, to which the single-trees $f f$ are attached, is connected with the axle by means of a rod or bar, G, the rear end of which is hooked to an arm, H, attached to the under side of the axle, and the front end has a keeper, $g$, formed on or attached to it, so as to slide freely on the tongue B. The whiffletree or bar E has an arm, $e$, attached at its center, and passing through a vertical slot, $b$, in the tongue, to serve as a guide when the bar E is moved forward or backward. A lever, J, is attached to the rear side of the axle A, by which it is raised and lowered by the driver. K is a standard, with a catch on its upper end, for engagement with the lever when in a horizontal position. The rod G may be, if desired, formed of two pieces, one of which may have its rear end connected to the arm H and its front end to the bar E, and the other piece may have its rear end attached to the bar E, and the keeper $g$ formed on its front end, as shown in Fig. 2.

When it is desired to raise the shovels from the ground, the lever J is depressed until its front end engages with the catch on the standard K, when the axle is made to turn on its hinges, throwing the bars D into a horizontal position, where they are held, as shown in Fig. 2, the arm H bearing the strain of the draft.

I claim as new and desire to secure by Letters Patent—

In a wheel-cultivator, the combination of the hinged axle A, and shovel-standards rigidly attached thereto, with the arm H and evener E, connected by the draft-rod G, and the tongue B, substantially as shown and described.

In testimony that I claim the foregoing as my invention I hereunto affix my signature this 29th day of November, 1873.

LEVI JUDSON DAVIS.

Witnesses:
 J. H. DAVIS,
 CHARLES BISSELL.